Patented July 10, 1945

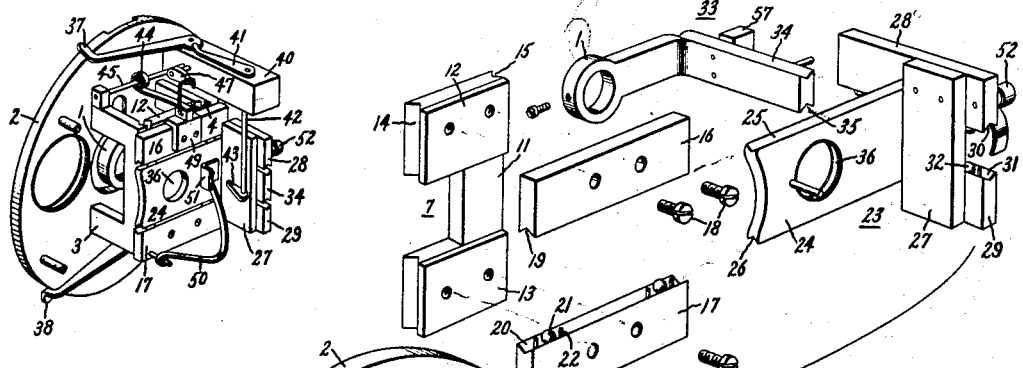
July 10, 1945.  C. H. BACHMAN ET AL  2,380,209
POSITIONING MEANS
Filed Dec. 11, 1942
Inventors:
Charles H. Bachman,
Jacob T. Tschopp,
by Harry E. Dunham
Their Attorney.

2,380,209

UNITED STATES PATENT OFFICE 2,380,209

POSITIONING MEANS

Charles H. Bachman, Scotia, and Jacob T. Tschopp, Schenectady, N. Y., assignors to General Electric Company, a corporation of New York Application December 11, 1942, Serial No. 468,676

10 Claims. (Cl. 88—40)

Our invention relates to positioning means, and more particularly to devices for manipulating or controlling the position of an article.

It is frequently desirable to control the position of an article or an element to be examined. For example, in some types of microscopes, such as an electron microscope, it is desirable to control not only the position of an article or specimen to be examined, but it is also important that the specimen be capable of being moved in three independent directions. It is furthermore of considerable importance to provide mechanisms which permit precise and minute adjustment of the specimen position and which obtain such manipulation without involving complex mechanisms which are not only expensive to manufacture, but frequently result in relatively large and cumbersome assemblies in comparison with the specimen to be examined and the available space for locating such mechanisms.

It is an object of our invention to provide a new and improved positioning device or manipulator.

It is another object of our invention to provide a new and improved positioning device of simple construction and arrangement, whereby an object or article to be investigated may be precisely positioned in three different planes by relatively independent mechanisms.

It is a further object of our invention to provide a new and improved manipulator comprising three mutually perpendicular traversing members supported by suitable ways, and whereby an article or object to be examined may be precisely positioned relative to three independent planes.

It is a still further object of our invention to provide a new and improved manipulator for holding and positioning an object, and which comprises three mutually perpendicular traversing members supported by suitable ways and wherein the traversing members are selectively actuated by means of suitable motion transmitting means, rendering the manipulator readily usable in manual and automatic operations.

Briefly stated, in the illustrated embodiment of our invention we provide a manipulator or positioning device for controlling and holding an article or object, and which is susceptible of producing three substantially independent directions of motion. Three mutually perpendicular traversing members are supported from a base plate and independent movement of the various traversing members is obtained by means of three independently operable lever mechanisms which operate as motion transmitting reduction means so that the object or article is moved precise distances in response to manual or automatic means which actuate the respective lever mechanisms.

For a better understanding of our invention, reference may be had to the following description taken in connection with the accompanying drawing, and its scope will be pointed out in the appended claims. Fig. 1 is a perspective view of our positioning device or manipulator; and Fig. 2 is an exploded view of some of the essential elements including the base plate, ways members, the article carrier, and the various traversing members. Figs. 3 and 4 are simplified front and side views, respectively, of the manipulator showing the operation thereof in the production of the horizontal transverse motion obtainable thereby; Figs. 5 and 6 are simplified front and side views of the manipulator showing positions of elements when employed to obtain transverse vertical motion, and Figs. 7 and 8 are further simplified front and side views of the manipulator when employed to produce longitudinal motion.

Our invention will be first described in connection with Fig. 1, which is a perspective view, and the exploded view shown in Fig. 2, the latter of which represents primary elements of the manipulator comprising the various ways and the associated traversing members. Other elements of the manipulator, particularly the lever mechanisms for obtaining the horizontal transverse motion and the longitudinal motion, will be apparent from the views shown in Figs. 3 and 4, and Figs. 7 and 8, respectively.

Referring now to Figs. 1 and 2, our invention is illustrated as applied to a positioning device or manipulator for controlling the position of an object or article which is to be supported by an article carrier 1 which may comprise a right angle extension of a horizontal traversing member to be described hereinafter. The manipulator may comprise a plate supporting member or base plate 2 to which are attached a pair of vertical, substantially parallel ways 3 and 4 provided with races 5 and 6, preferably of concave or V-shaped configuration, in order to minimize the resistance to the motion of a vertical traversing member 7. The vertical traversing member is arranged to be in slidable engagement with ways 3 and 4. In order to reduce resistance still further, we provide a plurality of miniature ball bearings 8 and 9, shown in Fig. 2, and which may be retained in the desired position in the races 5 and 6 by means of retaining pins 10.

The vertical traversing member may be of U-shaped configuration, as illustrated in Fig. 2, and may comprise an intermediate member 11 terminated at each end by traversing parts 12 and 13, each of which is provided with V-shaped races 14 and 15 which engage the miniature ball bearings described above, and which are held in position by ways 3 and 4.

Horizontal ways members 16 and 17 are attached to the vertical traversing parts 12 and 13 by a suitable mechanical expedient such as screws 18, and are provided with races 19 and 20 which are perpendicular to races 5 and 6 of the vertical ways 3 and 4. Races 19 and 20 are also V-shaped or concave and are provided with miniature ball bearings 21 also held in the desired position by retaining pins 22.

There is also provided a horizontal traversing member 23 comprising a part 24 having races 25 and 26 which engage the ball bearings 21, and which is provided at one end with a supporting plate 27 to which are attached a pair of longitudinal ways 28 and 29. These latter ways are also provided with the same type of concave races 30 and 31 and associated ball bearings 32. We also provide a longitudinal traversing member 33 which may be formed integral with the article carrier 1 and is provided with races 34 and 35 which engage ball bearings 32 supported in the races of the longitudinal ways 28 and 29.

Where the manipulator shown in Fig. 1 is employed in connection with an apparatus, such as an electron microscope, and where it is desired to permit the passage of an electron beam therethrough, the horizontal traversing member part 24 may be provided with an opening 36 in alinement with the opening of the article carrier 1. Inasmuch as these members are interconnected, the apertures are maintained in alinement.

In accordance with another feature of our invention, we also provide a plurality of independent means for selectively adjusting or positioning the various above described traversing members 7, 23 and 33. Furthermore, these individual means may comprise independent lever mechanisms arranged to reduce motion so that the article or object to be examined is moved minute distances in response to predetermined controlling operations which may be either manual or automatic. For example, we provide a plurality of lever mechanisms including actuating levers 37, 38 and 39, the latter of which is shown in Figs. 5 and 6.

Considering the lever mechanism shown in Fig. 1 which is associated with actuating lever 37, we provide a supporting block 40 which is attached to base plate 2 and which supports actuating lever 37, a crank 41, and a connecting rod 42 terminated at one end by a cam 43 which engages plate 27. Movement of the lever 37 ultimately causes motion of cam 43 and positions the horizontal traversing member 23 to a desired position established by the position of the lever 37.

We also provide back-lash preventing means for permitting rapid and accurate control of the position of the article carrier. More particularly, we provide a plurality of independent resilient or spring biasing means associated with each of the traversing members, thereby biasing the respective traversing members to a predetermined initial or rest position and consequently tending to restore the article carrier 1 to a predetermined position upon release of pressure against the actuating levers 37—39.

Referring to the back-lash preventing means associated with the vertical transverse motion mechanism, we provide a spiral spring 44 supported by a rod 45 which in turn is supported at one end by way 3 and block 40. The spring is designed and positioned so that it tends to exert a pressure downwardly on horizontal way 16, and inasmuch as this way is attached rigidly to the traversing member 7 it also exerts a downward force thereon.

The lever mechanism associated with the actuating lever 39 which produces the vertical transverse motion will now be considered with particular reference to Figs. 5 and 6 wherein the lever 39, which is supported by block 40, is shown as being connected to the horizontal way 16 through a connecting rod 46, a crank 47 and a link 48, the latter of which is attached to way 16 by means of a fixture 49.

The back-lash preventing means associated with the horizontal traversing member 23 may take the form shown in Fig. 5 which comprises a spring 50 anchored at one end to the longitudinal way 17 and exerting a force against traversing member part 24 by engaging an abutment 51 attached thereto.

In Fig. 6 there is illustrated a further back-lash preventing means for returning the horizontal traversing member 33 to an initial position upon release of the pressure against lever 38. This back-lash preventing means may comprise a spring 52 anchored at one end to the longitudinal way 28 and engaging a pin 53 carried by the longitudinal traversing member 33.

The lever mechanism for producing the longitudinal motion may be fully appreciated by referring to Figs. 7 and 8 which are simplified views of the mechanism utilized for producing the longitudinal motion. Actuating lever 38 is supported from base plate 2 by means of a fixture 54 and is connected to a cam 55 through a crank 56, the former of which engages an abutment 57 of the longitudinal traversing member 33.

Selective actuation of levers 37, 38 and 39 permits independent and selective control of the position of the holder or carrier 1 in any one of the three planes. Of course, concurrent motion of two or three of the levers produces a resultant motion which is determined by the relative movements of each lever so actuated.

Figs. 3 and 4, which are front and side views respectively of the positioning means when operated to produce horizontal transverse motion of the actuation of lever 37, indicate that upon movement of lever 37 forward, that is away from the drawing, lever 37 actuates crank 41 which in turn rotates connecting rod 42 to move cam 43, thereby exerting a pressure against the structure of the horizontal traversing member 23 and thereby moving the horizontal traversing member to the right. This action, of course, takes place under the effect of the restraining force produced by the back-lash spring 50.

The vertical motion obtainable by the manipulator may be appreciated by referring to Figs. 5 and 6 which are, respectively, simplified front and side views showing the essential structure for obtaining this type of motion. Upon movement of the actuating lever 39 away from the plane of the drawing viewed from Fig. 5, connecting rod 46 is rotated thereby raising cam or crank 47 and consequently raising not only the horizontal ways 16, 17 and the associated horizontal traversing member 23 but also raising the vertical traversing member 7. Of course, inasmuch as the longitudinal ways 28 and 29 are also attached to the horizontal traversing member 23, the horizontal ways 28 and 29 together with cooperating longitudinal traversing member 33 will be raised a corresponding distance. This action takes place against the restraining effect due to the back-lash preventing spring 44.

The longitudinal motion obtainable by the manipulator may be appreciated by referring to Figs. 7 and 8 which represent the essential elements of the manipulator for producing this type of motion. Upon movement of the actuating lever 38 away from the plane of the drawing viewed from Fig. 7, crank 56 is actuated thereby moving cam 55 in a counterclockwise direction (Fig. 8), the latter serving to exert a pressure against abutment 57, effecting movement of the longitudinal traversing member 33 to the left.

The above described motion transmitting mechanisms and associated ways permit substantially independent control of the position of the article carrier 1 in any selected plane. This precise control of the position of the article carrier is obtained not only by the mutually perpendicular relationships of the various traversing members, but is also obtained by proper positioning of the various actuating means for the respective traversing members. For example, although the vertical ways 3 and 4 can be directly attached to the actuating mechanism including crank 47, ways 16 and 17 are preferably arranged so that the cam 43 operates on plate 27 which is preferably parallel with and lying in alinement with the motion of the vertical traversing member 7. Furthermore, cam 55 preferably contacts abutment 57 which lies in a plane parallel to the plane of the motions of the traversing members 7 and 24.

An additional feature is provided by the above described apparatus wherein the actuating mechanism exerts the minimum or no torsional effect on the various traversing members.

In addition, the various back-lash preventing means including springs 44, 50 and 52 are arranged so that the contact parts thereof with the respective traversing members lie in substantial alinement with the various contacting members or cams of the associated actuating mechanisms. For example, the end of spring 44 is in substantial coincidence with pin 48; the contact point of spring 50 is in a line with the contact point of actuating cam 43; and the actuating point of cam 55 is in alinement with pin 53.

Although in the above illustrated embodiment of our invention we have chosen to employ a particular arrangement of motion reduction means to obtain the desired precise positioning of the article carrier, it will be appreciated that other motion reducing elements may be employed for this purpose without departing from the purview of our invention.

One of the principal advantages of the positioning device which we provide is the facility with which a longitudinal motion, or motions, that is motions perpendicular to the plane of part 2, are employed to obtain three independent directions of movement of the article carrier 1. For example, forces applied to the ends of actuating levers 37, 38 and 39 substantially perpendicular to the plane of base plate 2 control the longitudinal, vertical and horizontal positions of the article carrier 1. This type of mechanism offers decided advantages in systems to which manipulators may be applied due to the fact that the mechanism, if employed for actuation of the manipulator, may have uniform motion transmitting characteristics. That is, longitudinal motions applied to the levers 37—39 may be employed for selective attainment of horizontal, vertical and longitudinal adjustments in position of the article carrier 1.

While we have shown and described our invention as applied to a particular device, it will be obvious to those skilled in the art that changes and modifications may be made without departing from our invention, and we, therefore, aim in the appended claims to cover all such changes and modifications as fall within the true spirit and scope of our invention.

What we claim as new and desire to secure by Letters Patent of the United States is:

1. In a device for controlling the position of an article, the combination including a supporting plate member, a pair of substantially parallel ways members attached to said supporting plate and having a traversing member in engagement with races provided by said ways members, a second pair of members having ways substantially perpendicular to said races, a third set of ways members lying in a plane perpendicular to the first-mentioned and second-mentioned ways members and supported by the second-mentioned ways members, an article support carried by said third set of ways members, and three mechanisms for independently controlling the vertical, horizontal and longitudinal motion of said support, each of said mechanisms being operable by the application thereto of a force perpendicular to said supporting plate member.

2. In a device for controlling the position of an article, the combination including a supporting plate member, a pair of substantially parallel vertical ways members attached to said supporting plate member and having a traversing member provided with a pair of horizontal ways members, a horizontal traversing member engaged by the horizontal ways members and provided with a pair of longitudinal ways members substantially perpendicular to the last-mentioned traversing member, an article supporting member carried by said longitudinal ways members, and three mechanisms for independently controlling the vertical, horizontal and longitudinal motion of said article supporting member, each of said mechanisms being operable by the application thereto of a force perpendicular to said supporting plate member.

3. In a positioning device capable of providing three independent motions, the combination comprising a vertical supporting plate, a pair of vertical substantially parallel ways members attached to said supporting plate and having a traversing member in engagement with races provided by said ways members, a horizontal traversing member supported by ways attached to the vertical traversing member, longitudinal ways members supported by said horizontal traversing member, an article carrier supported by the longitudinal ways members, three mechanisms for independently controlling the vertical, horizontal and longitudinal motion of said carrier, each of said mechanisms being operable by the application thereto of a force perpendicular to said supporting plate, and a plurality of resilient means each associated with a different one of the traversing members and said article carrier tending to restore said article carrier to a predetermined position.

4. In a positioning device capable of providing three independent directions of motion, the combination comprising a vertical supporting plate, a pair of vertical substantially parallel ways members attached to said supporting plate and having a traversing member in engagement with races provided by said ways members, a horizontal traversing member supported by ways carried by the vertical traversing member, longitudinal ways members supported by said horizontal traversing member, an article carrier supported by the longitudinal ways members, a plurality of individual lever mechanisms for selectively and individually actuating the vertical and horizontal traversing members and the article carrier, each of said mechanisms being operable by the application thereto of a force perpendicular to said supporting plate, and back-lash preventing means for said vertical traversing member, said horizontal traversing member and said article carrier.

5. In a positioning device capable of providing three independent motions, the combination comprising a supporting plate, a pair of substantially parallel ways members attached to said supporting plate and having a traversing member in engagement therewith, a horizontal traversing member supported by ways carried by the first mentioned traversing member, longitudinal ways carried by the horizontal traversing member, an article carrier supported by the longitudinal ways, three mechanisms for independently controlling the vertical, horizontal and longitudinal motion of said carrier, each of said mechanisms being operable by the application thereto of a force perpendicular to said supporting plate, back-lash preventing means comprising a spring anchored at one end for exerting a downward pressure on said first-mentioned traversing member and said horizontal ways, a second back-lash preventing means comprising a spring anchored at one end to one of said horizontal ways for establishing a predetermined position of the horizontal traversing member, and a third back-lash preventing means comprising a spring anchored to one of the longitudinal ways tending to move said article carrier to a predetermined position.

6. In a positioning device capable of three independent directions of motion, the combination comprising a base plate, a pair of substantially parallel ways having a vertical traversing member, a pair of horizontal ways attached to the vertical traversing member and having a horizontal traversing member, a pair of longitudinal ways carried by the horizontal traversing member and provided with a longitudinal traversing member in sliding engagement therewith, an article carrier supported by the longitudinal traversing member, three mechanisms for independently controlling the vertical, horizontal and longitudinal motion of said carrier, each of said mechanisms being operable by the application thereto of a force perpendicular to said base plate, and a pair of resilient spring biasing means one of which is associated with one of the horizontal ways members and the horizontal traversing member and the other of which is associated with one of the longitudinal ways and the longitudinal traversing member.

7. In a positioning device capable of producing three independent directions of motion, the combination including a supporting plate, a pair of vertical substantially parallel ways members attached to said supporting plate and provided with races for engaging a vertical traversing member, said vertical traversing member being provided with a pair of horizontal ways members which support a horizontal traversing member, a pair of longitudinal ways members carried by the horizontal traversing member and supporting an article carrier and a longitudinal traversing member, and three mechanisms for independently controlling the vertical, horizontal and longitudinal traversing members and each comprising an actuating means pivoted about an axis fixed with respect to said supporting plate, and means operatively connecting each of said actuating means and the respective one of said traversing members and slidable with respect to the movement of said respective member.

8. In a positioning device capable of producing three independent directions of motion, the combination including a supporting plate, a pair of vertical substantially parallel ways members attached to said supporting plate and provided with races for engaging a vertical traversing member, said vertical traversing member being provided with a pair of horizontal ways members which support a horizontal traversing member, a pair of longitudinal ways members carried by the horizontal traversing member and supporting an article carrier and a longitudinal traversing member, and three mechanisms for selectively and independently controlling the vertical, horizontal and longitudinal traversing members and each including actuating means pivotally supported by structure attached to the supporting plate and means operatively connecting each of said actuating means with the respective one of said traversing members and slidable with respect to the movement of said respective member.

9. In a positioning device capable of producing three independent directions of motion, the combination including a supporting plate, a pair of vertical substantially parallel ways members attached to said supporting plate and provided with races for engaging a vertical traversing member, said vertical traversing member being provided with horizontal ways members which support a horizontal traversing member, longitudinal ways members carried by the horizontal traversing member and supporting an article carrier, three mechanisms for selectively controlling the vertical, horizontal and longitudinal traversing members, the mechanism for the horizontal traversing member acting upon a plate thereof which is parallel to the motion of the vertical traversing member, and the longitudinal actuating mechanism contacting a plate attached to the longitudinal member which plate lies parallel to the plane of the vertical and horizontal motions, each of said mechanisms being operable by the application thereto of a force perpendicular to said supporting plate.

10. In a positioning device capable of producing three independent directions of motion, the combination including a supporting plate, a pair of vertical substantially parallel ways members attached to said supporting plate and provided with races for engaging a vertical traversing member, said vertical traversing member being provided with a pair of horizontal ways members which support a horizontal traversing member, a pair of longitudinal ways members carried by the horizontal traversing member and supporting an article carrier, three mechanisms for selectively controlling the vertical, horizontal and longitudinal traversing members, each of said mechanisms being operable by the application thereto of a force perpendicular to said supporting plate, and a plurality of individual back-lash preventing means comprising resilient members contacting the various traversing members at points in alinement with the contact points of the actuating members.

CHARLES H. BACHMAN.
JACOB T. TSCHOPP.